H. NISEN.

Improvement in Harvester-Droppers.

No. 127,636.  
Patented June 4, 1872.

Witnesses:  
B. L. Corss  
J. E. Smith

Inventor:  
Hubert Nisen  
By J. B. Smith  
his Atty in fact.

127,636

UNITED STATES PATENT OFFICE.

HUBERT NISEN, OF BRIGHTON, WISCONSIN.

IMPROVEMENT IN HARVESTER-DROPPERS.

Specification forming part of Letters Patent No. 127,636, dated June 4, 1872.

SPECIFICATION.

I, HUBERT NISEN, of Brighton, in the county of Kenosha, in the State of Wisconsin, have invented certain Improvements in Harvester-Droppers, of which the following is a specification:

*Nature and Object of the Invention.*

My invention is a grain-dropper, to be attached to a harvester, and takes the grain and carries it out behind the wheels and drops it on the ground, and is arranged so as to swing round; and at the same time a cut-off rises and holds the cut grain till the dropper swings back again.

Figure 1:
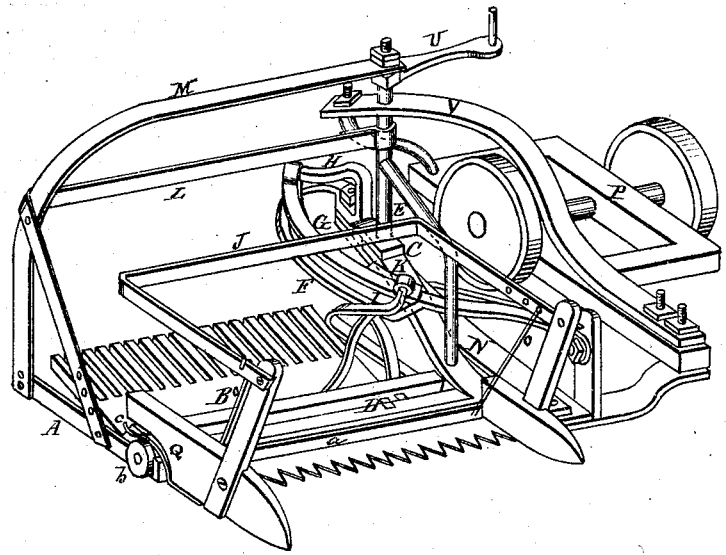
Figure 2:
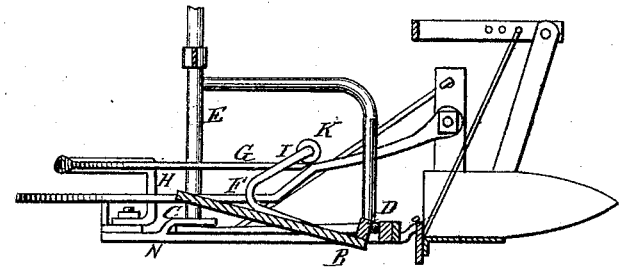

Figure 1 is a perspective view of my invention. Fig. 2 is a sectional view.

P is the frame of the reaper; N, the frame of the movable part of the dropper. C is the joint where the movable part of the dropper is secured to the frame. B is the part of the dropper hinged to the other movable part with a board or slats attached to it, which drops down at the proper time to discharge the grain; E, the turning bar, which, with a crank on its end, turns the movable part of the dropper B out to discharge the grain; F, a bar, on which wheel K runs to bring the movable part of the dropper back after it has been out and unloaded; G, the wheeling dropping-bar, on which the wheel K runs out when the movable part of the dropper is carried out, and the wheel returns under it on the bar F; and when the wheel gets near the end of F it strikes under the crooked end of G and raises the bar up and passes under it, and the dropping-bar G falls back to its place again when the wheel has passed clear to the end; H, the wheeling dropping-bar axle, to which the dropping-bar G is attached; I, axle for wheel K to run on, and is attached to bar D; K, the dropping-wheel, which runs out and in and supports the movable part D of the dropper by moving on bar G. Braces L and M run from the turning bar E to the outside of the movable parts of the dropper, and are attached to the bar A for supporting said movable parts; J, cut-off for the grain, hinged on standard on the outside of the grain-board. This cut-off is made with five holes on each side near the standards. These holes are to attach the cut-off to the standards, and to vary their length according to the length of the grain. A rod, o, has its upper end in one of the five holes, and the other end hanging down and passing through the plate a on the sickle-bar, so that movable part D strikes it when it comes back after having been out and discharged the grain, and throws cut-off up and lets the grain fall on the dropper again. A wheel, b, on the end of movable part D, as part D comes back, strikes under spring c on the sickle-bar and holds part D securely in position. An iron plate, a, is screwed onto the back side of the sickle-bar to prevent the grain from falling off when the dropper is removed; Q, a notch cut out under the back side of the outside grain-board, to let the dropper come up to the sickle-bar; U, crank to operate the dropper with; V, brace sustaining the turning bar.

This machine is operated by a person driving, the same as other harvesters. As the grain is cut it falls on the dropper B and D; and when there is enough for a gavel the driver takes hold of crank U and turns it, and the dropper turns out, wheel K running out on bar G till it comes to the end, when it falls off and the grain is discharged. As the dropper moves out from the sickle-bar the cut-off falls down, and the grain being cut falls on the cut-off, and it is held in position till the dropper returns, which, when it does, the point of movable part D strikes the bar o and throws the cut-off up again out of the way of the grain; and it falls onto the dropper again, as the dropper returns, turned by crank U. The wheel K runs under bar G till it comes to its end, when it strikes the crank in its end, raises it, and passes by its end and is ready to be thrown out again.

Claims.

1. Dropping-bar B and D, turning bar E, wheel b, and frame A, in combination with spring c on the sickle-bar, substantially as described.

2. Dropping-bar B, cut-off J, and bar o, in combination with the frame A and iron a, substantially as described.

HUBERT NISEN.

Witnesses:
J. B. SMITH,
F. E. SMITH.